C. T. Belbin,

Oyster Dredge.

N° 55,228.    Patented June 5, 1866.

Witnesses.
Chas. A. Pettit
Jas. L. Ewin

Inventor.
Chas. Thos. Belbin
By Munn & Co.
Attorneys

UNITED STATES PATENT OFFICE.

CHAS. T. BELBIN, OF BALTIMORE, MARYLAND.

IMPROVED DREDGE-ROLLER FOR OYSTER-BOATS.

Specification forming part of Letters Patent No. 55,228, dated June 5, 1866.

*To all whom it may concern:*

Be it known that I, CHARLES THOMAS BELBIN, of the city and county of Baltimore, and State of Maryland, have made new and useful Improvements in Dredge-Rollers for Oyster-Boats and other purposes; and I do hereby declare the following to be a full, clear, and exact description of the nature, construction, and operation of the same, sufficient to enable one skilled in the art to which my invention appertains to construct and use the same, reference being had to the accompanying drawings, which are made part of this specification, and in which the same letters indicate corresponding parts in the different figures.

Figure 1:
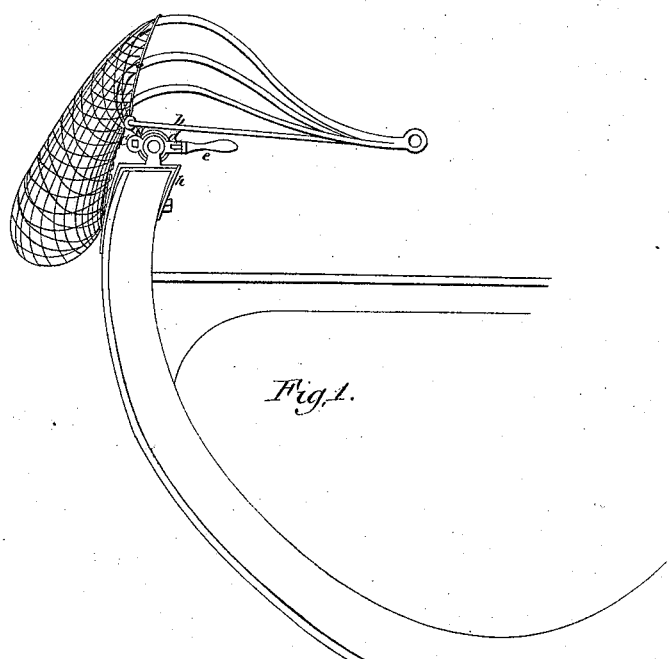
Figures 2, 3:
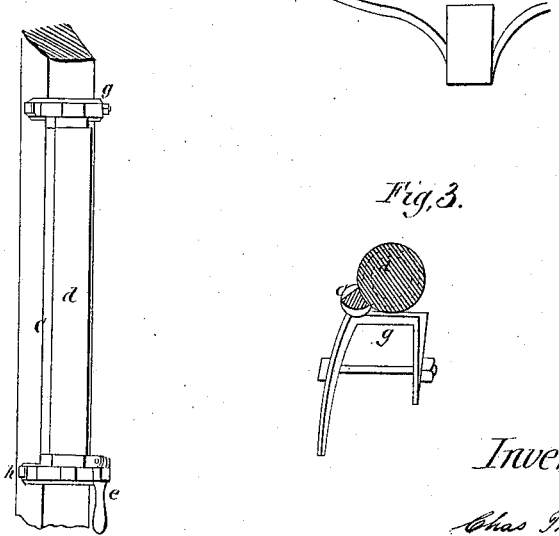

Figure 1 is a cross-section of a boat with my improved dredge-roller upon its gunwale. Fig. 2 is a top view of the dredge-roller. Fig. 3 is a cross-section.

The improvement consists of a ledge or flange attached to the roller in such a manner as to catch and carry the spurs or teeth of the rake and to enable the dredge to be readily landed over the side or gunwale of the boat.

With the ordinary rollers the teeth of the rake catch upon it so as to gain the roller and necessitate the lifting of the dredge or the disengagement of the teeth from the roller by other means; but in my improvement as soon as the teeth $a$ of the dredge-rake $b$ come upon the ledge $c$ of the roller $d$ the handle $e$ of the roller is drawn down, and the rake thus lifted and thrown forward, so that it may be readily hauled on board the boat. This feature is shown in Fig. 1, where the lever is brought down nearly to its lowest position, the dredge having nearly reached the position for its final pull into the boat.

$g\ h$ are the arms or brackets in which the roller is journaled, and by which it is secured to the gunwale of the boat.

Having described my invention, what I claim as new, and desire to secure by Letters Patent, is—

The arrangement on the roller $d$ of the ledge or flange $c$ and the handle $e$, as and for the purpose described.

CHARLES THOMAS BELBIN.

Witnesses:
   SOL. J. MAILHOUSE,
   H. WINER.